(12) United States Patent
Peng et al.

(10) Patent No.: US 9,432,558 B2
(45) Date of Patent: *Aug. 30, 2016

(54) IMAGE CAPTURING MODULE HAVING A BUILT-IN DUSTPROOF STRUCTURE

(71) Applicant: LARVIEW TECHNOLOGIES CORP., Taoyuan County (TW)

(72) Inventors: Kuo-Hao Peng, Hsinchu (TW); Po-Chih Hsu, Hsinchu County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 75 days.

This patent is subject to a terminal disclaimer.

(21) Appl. No.: 14/333,295

(22) Filed: Jul. 16, 2014

(65) Prior Publication Data

US 2016/0021282 A1    Jan. 21, 2016

(51) Int. Cl.
*H04N 5/225* (2006.01)
*H04N 5/217* (2011.01)

(52) U.S. Cl.
CPC .......... *H04N 5/2252* (2013.01); *H04N 5/2253* (2013.01); *H04N 5/2171* (2013.01)

(58) Field of Classification Search
CPC . H04N 5/2252; H04N 5/2253; H04N 2/2171
See application file for complete search history.

(56) References Cited

U.S. PATENT DOCUMENTS

| 7,460,317 | B2 * | 12/2008 | Webster | G02B 7/02 359/811 |
| 8,902,325 | B2 * | 12/2014 | Weatherford | H04N 5/341 348/222.1 |
| 2007/0064317 | A1 * | 3/2007 | Chen | H04N 5/2253 359/811 |

* cited by examiner

*Primary Examiner* — Ahmed A Berhan
(74) *Attorney, Agent, or Firm* — Li & Cai Intellectual Property (USA) Office

(57) ABSTRACT

An image capturing module having a built-in dustproof structure includes an image sensing unit, a housing frame and an actuator structure. The image sensing unit includes a substrate and an image sensing chip disposed on the substrate. The housing frame is disposed on the substrate to surround the image sensing chip. The actuator structure includes a lens holder disposed on the housing frame and a movable lens assembly movably disposed inside the lens holder. More precisely, the lens holder has a first surrounding structure disposed on the inner surrounding surface thereof, and the movable lens assembly has a second surrounding structure disposed on the outer perimeter surface thereof and located above the first surrounding structure, and the first surrounding structure of the lens holder and the second surrounding structure of the movable lens assembly are mated with each other to form the built-in dustproof structure.

10 Claims, 9 Drawing Sheets

IMAGE CAPTURING MODULE HAVING A BUILT-IN DUSTPROOF STRUCTURE

BACKGROUND OF THE INVENTION

1. Field of the Invention

The instant disclosure relates to an image-capturing module, and more particularly to an image-capturing module having a built-in dustproof structure.

2. Description of Related Art

Recently, it becomes more and more popular for portable devices such as mobile phones or PDA to be equipped with an imaging module. Furthermore, since the market trends of the requirement of more functions and smaller sizes, the imaging modules with high definition are required to downsize. One of the improvements of definition is to increase the number of pixel. The pixel number of an imaging module has already increased from the VGA-level 30 pixels to 2, 5, 8, 13 or even 41 million pixels, which is common in the market. Beside the increase of the pixel, another improvement lies in the definition of the image. Thus, the imaging module of a portable device also develops from a fixed-focus mode to an auto-focus mode or even optical zoom mode.

The auto-focus mode employs the principle of moving the lens in the imaging module suitably according to various distances of targets, whereby the optical image of the desired target can be focused correctly on an image sensor so as to generate a clear image. The common ways of activating the lens to move in the imaging module include activating by a stepping motor, piezoelectric motor and voice coil motor (VCM). However, there is no any dustproof design for the prior imaging module.

SUMMARY OF THE INVENTION

One aspect of the instant disclosure relates to an image capturing module having a built-in dustproof structure.

One of the embodiments of the instant disclosure provides an image capturing module having a built-in dustproof structure, comprising: an image sensing unit, a housing frame and an actuator structure. The image sensing unit includes a substrate and an image sensing chip disposed on the substrate and electrically connected to the substrate. The housing frame is disposed on the substrate to surround the image sensing chip. The actuator structure is disposed on the housing frame and above the image sensing chip, wherein the actuator structure includes a lens holder disposed on the housing frame and a movable lens assembly movably disposed inside the lens holder. More precisely, the lens holder has a first surrounding structure disposed on the inner surrounding surface thereof, and the movable lens assembly has a second surrounding structure disposed on the outer perimeter surface thereof and located above the first surrounding structure, and the first surrounding structure of the lens holder and the second surrounding structure of the movable lens assembly are mated with each other to form the built-in dustproof structure.

Another one of the embodiments of the instant disclosure provides an image capturing module having a built-in dustproof structure, comprising: an image sensing unit, a housing frame and an actuator structure. The image sensing unit includes a substrate and an image sensing chip disposed on the substrate and electrically connected to the substrate. The housing frame is disposed on the substrate to surround the image sensing chip. The actuator structure is disposed on the housing frame and above the image sensing chip, wherein the actuator structure includes a lens holder disposed on the housing frame and a movable lens assembly disposed inside the lens holder, the lens holder includes a surrounding movable member movably disposed therein, the movable lens assembly is fixed inside the surrounding movable member through at least two tiny bonding glue, and the movable lens assembly is movably disposed inside the lens holder through the surrounding movable member. More precisely, the surrounding movable member of the lens holder has a first surrounding structure disposed on the inner surrounding surface thereof, and the movable lens assembly has a second surrounding structure disposed on the outer perimeter surface thereof and located above the first surrounding structure, and the first surrounding structure of the surrounding movable member and the second surrounding structure of the movable lens assembly are mated with each other to form the built-in dustproof structure.

More precisely, the image capturing module further comprises an optical filter disposed on the housing frame and located between the image sensing chip and the movable lens assembly, wherein the housing frame has a top opening enclosed by the optical filter, wherein both the inner surrounding surface of the lens holder and the outer perimeter surface of the movable lens assembly are threadless surfaces or thread surfaces.

Therefore, because the lens holder has a first surrounding structure disposed on the inner surrounding surface thereof and the movable lens assembly has a second surrounding structure disposed on the outer perimeter surface thereof and located above the first surrounding structure, the first surrounding structure of the lens holder and the second surrounding structure of the movable lens assembly can be mated with each other to form the built-in dustproof structure. Whereby, when the external dust passes through the gap between the lens holder (or the surrounding movable member) and the movable lens assembly to get into the built-in dustproof structure that is composed of the first surrounding structure and the second surrounding structure, the external dust is obstructed by the first surrounding blocking portion (or the second surrounding blocking portion), so that the external dust can be gathered in the first surrounding space (or the second surrounding space).

To further understand the techniques, means and effects of the instant disclosure applied for achieving the prescribed objectives, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

The embodiments of "an image capturing module having a built-in dustproof structure" of the instant disclosure are described below by means of specific examples, and other advantages and objectives of the instant disclosure can be easily understood by one skilled in the art from the disclosure of the description. The instant disclosure can be embodied or applied in other different embodiments, and various modifications and variations can be made to various details in the description for different applications without departing the scope of the instant disclosure. Also, the drawings of the instant disclosure are provided for only simple illustrations, and are not drawn to scale, that is, do not reflect the actual relative dimensions. The following embodiments are provided to describe in detail the concept of the instant disclosure, and are not intended to limit the scope thereof in any way.

First Embodiment

Figure 1:
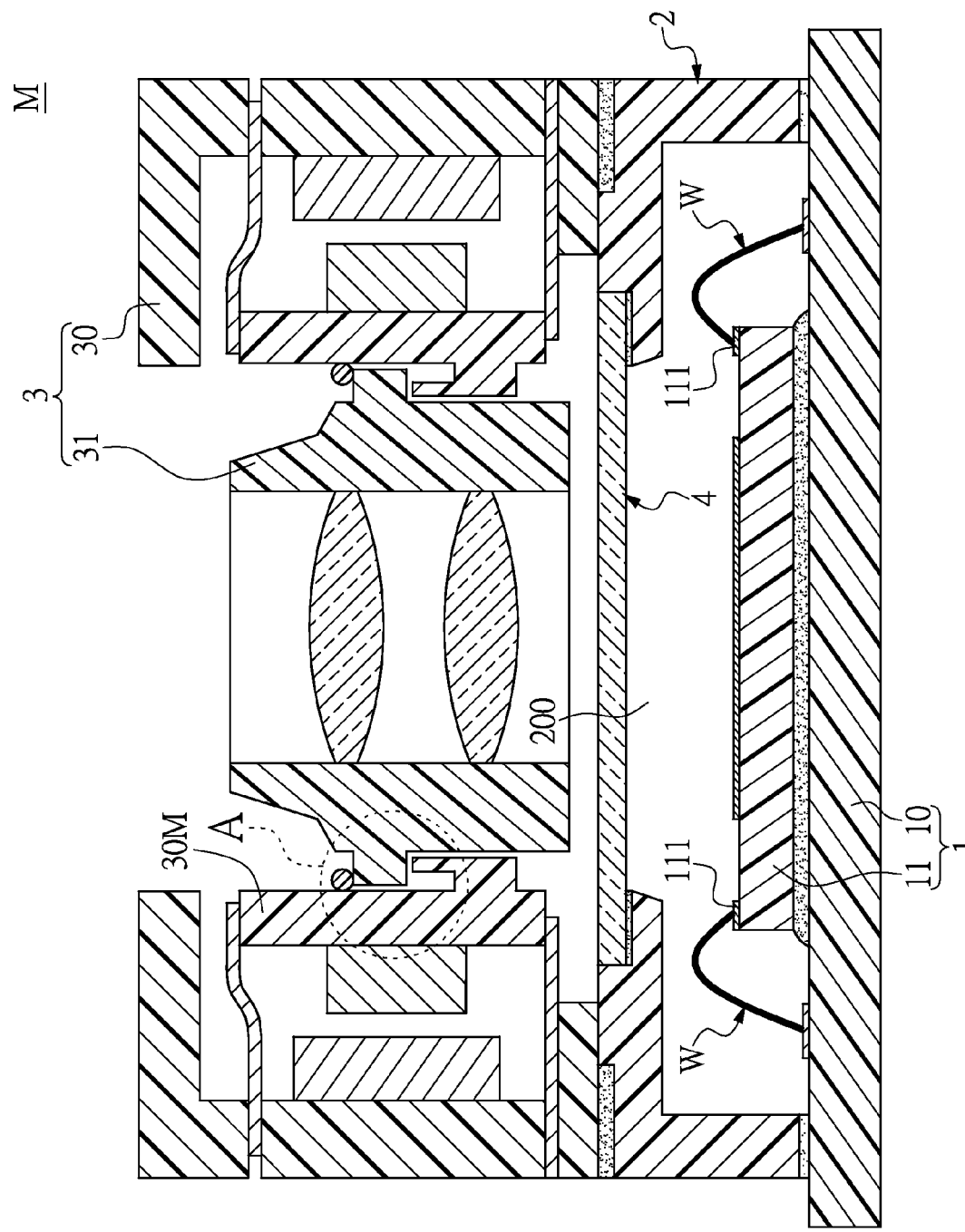
FIG. 1 shows a lateral, cross-sectional, schematic view of the image capturing module having a built-in dustproof structure and using a voice coil motor actuator according to the first embodiment of the instant disclosure.
Figure 2:
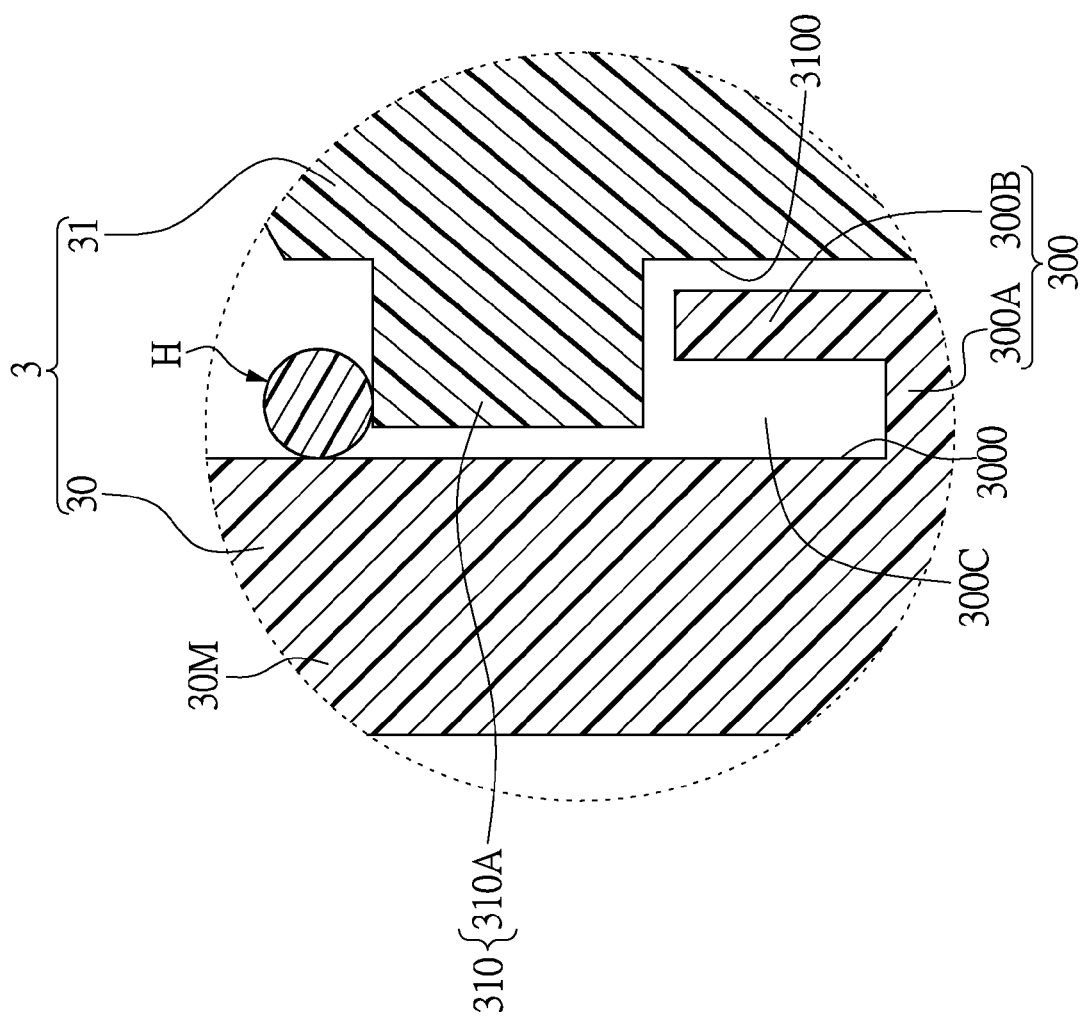
FIG. 2 is an enlarged view taken on part A of FIG. 1.

Referring to FIG. 1 and FIG. 2, FIG. 1 shows a lateral, cross-sectional, schematic view of the image capturing module having a built-in dustproof structure and using a voice coil motor actuator according to the first embodiment of the instant disclosure and FIG. 2 is an enlarged view taken on part A of FIG. 1, the first embodiment of the instant disclosure provides an image capturing module M having a built-in dustproof structure, comprising: an image sensing unit 1, a housing frame 2 and an actuator structure 3.

First, as shown in FIG. 1, the image sensing unit 1 includes a substrate 10 and an image sensing chip 11 disposed on the substrate 10 and electrically connected to the substrate 10. For example, the image sensing chip 11 may be a CMOS (Complementary Metal-Oxide-Semiconductor) image sensing chip, and the image sensing chip 11 can be adhesively disposed on the substrate 10 through any type of adhesive material (not labeled). In addition, the substrate 10 may be a circuit substrate having a plurality of conductive pads (not labeled) disposed on the top surface of the circuit substrate. The image sensing chip 11 has a plurality of conductive pads 111 disposed on the top surface of the image sensing chip 11, wherein each conductive pad 111 can be electrically connected to the corresponding conductive pad (not labeled) of the substrate 10 through a corresponding conductive wire W, thus the image sensing chip 11 can be electrically connected to the substrate 10 through the conductive wires W.

Figure 3:
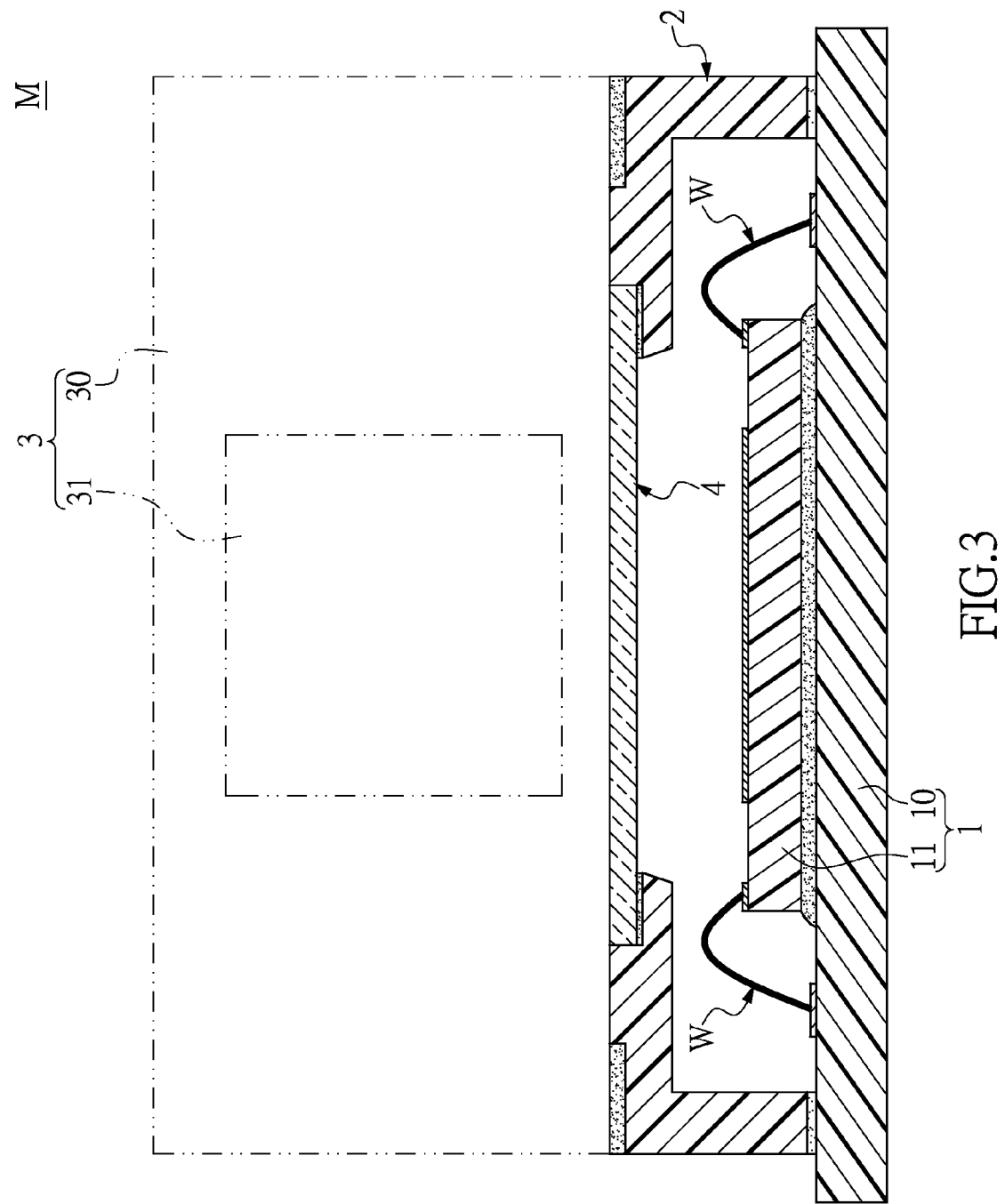
FIG. 3 shows a lateral, cross-sectional, schematic view of the image capturing module having a built-in dustproof structure and using another type of actuator according to the first embodiment of the instant disclosure.

Moreover, as shown in FIG. 1, the housing frame 2 is disposed on the substrate 10 to surround the image sensing chip 11. The actuator structure 3 is disposed on the housing frame 2 and above the image sensing chip 11, and the actuator structure 3 includes a lens holder 30 disposed on the housing frame 2 and a movable lens assembly 31 movably disposed inside the lens holder 30. For example, the housing frame 2 can be adhesively disposed on the substrate 10 through any type of adhesive material (not labeled), and the lens holder 30 also can be adhesively disposed on the housing frame 2 through any type of adhesive material (not labeled). The movable lens assembly 31 may be an optical lens group that is composed of a plurality of optical lenses (not labeled). In addition, it is worth mentioning that the actuator structure 3 may be a voice coil motor actuator, but the voice coil motor actuator used in the first embodiment is merely an example and is not meant to limit the instant disclosure (as shown in FIG. 3).

It is worth mentioning that the above-mentioned adhesive material may be UV adhesive glue, thermosetting glue or curing glue applied to oven etc., but it is merely an example and is not meant to limit the instant disclosure.

More precisely, as shown in FIG. 1, the image capturing module M further comprises an optical filter 4 disposed on the housing frame 2 and located between the image sensing chip 11 and the movable lens assembly 31. In addition, the housing frame 2 has a top opening 200 enclosed by the optical filter 4.

More precisely, referring to FIG. 1 and FIG. 2, the lens holder 30 has a first surrounding structure 300 disposed on the inner surrounding surface 3000 (i.e., an inner wall surface) thereof, and the movable lens assembly 31 has a second surrounding structure 310 disposed on the outer perimeter surface 3100 (i.e., an outer periphery surface) thereof and located above the first surrounding structure 300. The first surrounding structure 300 of the lens holder 30 and the second surrounding structure 310 of the movable lens assembly 31 are mated with each other to form the built-in dustproof structure.

For example, as shown in FIG. 2, the first surrounding structure 300 has a first surrounding extending portion 300A substantially horizontally extended from the inner surrounding surface 3000 of the lens holder 30 and toward the outer perimeter surface 3100 of the movable lens assembly 31 and a first surrounding blocking (retaining or obstructing) portion 300B substantially upwardly and vertically extended from the first surrounding extending portion 300A, and the inner surrounding surface 3000, the first surrounding extending portion 300A and the first surrounding blocking portion 300B of the lens holder 30 are sequentially connected (to one another) to form a first surrounding space 300C. In addition, the second surrounding structure 310 has a second surrounding extending portion 310A substantially horizontally extended from the outer perimeter surface 3100 of the movable lens assembly 31 and toward the inner surrounding surface 3000 of the lens holder 30, and the second surrounding extending portion 310A is adjacent to the first surrounding blocking portion 300B and disposed above the first surrounding blocking portion 300B. Moreover, both the inner surrounding surface 3000 of the lens holder 30 and the outer perimeter surface 3100 of the movable lens assembly 31 are thread surfaces or threadless (or unthreaded) surfaces (i.e., without any thread or screw on the inner surrounding surface 3000 and the outer perimeter surface 3100).

More precisely, referring to FIG. 1 and FIG. 2, the lens holder 30 includes a surrounding movable member 30M movably disposed therein, and the movable lens assembly 31 can be fixed inside the surrounding movable member 30M through only two or at least two tiny bonding glue H. Hence, the instant disclosure does not need to use a continuous and considerable bonding glue or an entire ring to fix the movable lens assembly 31 inside the surrounding movable member 30M, so as to reduce the manufacturing time and the manufacturing cost. In addition, because the movable lens assembly 31 is fixed inside the surrounding movable member 30M through the at least two tiny bonding glue H, the movable lens assembly 31 thus can be movably disposed inside the lens holder 30 through the surrounding movable member 30M. Moreover, both the inner surrounding surface 3000 of the surrounding movable member 30M and the outer perimeter surface 3100 of the movable lens assembly 31 are threadless surfaces or thread surfaces. Furthermore, the first surrounding structure 300 has a first surrounding extending portion 300A substantially horizontally extended from the inner surrounding surface 3000 of the surrounding movable member 30M and toward the outer perimeter surface 3100 of the movable lens assembly 31 and a first surrounding blocking portion 300B substantially upwardly and vertically extended from the first surrounding extending portion 300A, and the inner surrounding surface 3000, the first surrounding extending portion 300A and the first surrounding blocking portion 300B of the surrounding movable member 30M are sequentially connected to form a first surrounding space 300C. The second surrounding structure 310 has a second surrounding extending portion 310A substantially horizontally extended from the outer perimeter surface 3100 of the movable lens assembly 31 and toward the inner surrounding surface 3000 of the surrounding movable member 30M, and the second surrounding extending portion 310A is adjacent to the first surrounding blocking portion 300B and disposed above the first surrounding blocking portion 300.

Whereby, when the external dust passes through the gap between the inner surrounding surface 3000 of the lens holder 30 or the surrounding movable member 30M and the second surrounding extending portion 310A of the movable lens assembly 31 to get into the built-in dustproof structure that is composed of the first surrounding structure 300 and the second surrounding structure 310, the external dust is obstructed by the first surrounding blocking portion 300B, so that the external dust can be gathered in the first surrounding space 300C.

It is worth mentioning that the movable lens assembly 31 can be fixed inside the surrounding movable member 30M through the at least two tiny bonding glue H on the premise of the following conditions: (1) the bottom side of the surrounding movable member 30M directly contacts the top surface of the optical filter 4; (2) the bottom side of the surrounding movable member 30M directly contacts the top side of the housing frame 2; or (3) the second surrounding structure 310 directly contacts the first surrounding structure 300, but it is merely an example and is not meant to limit the instant disclosure.

Second Embodiment

Figure 4:
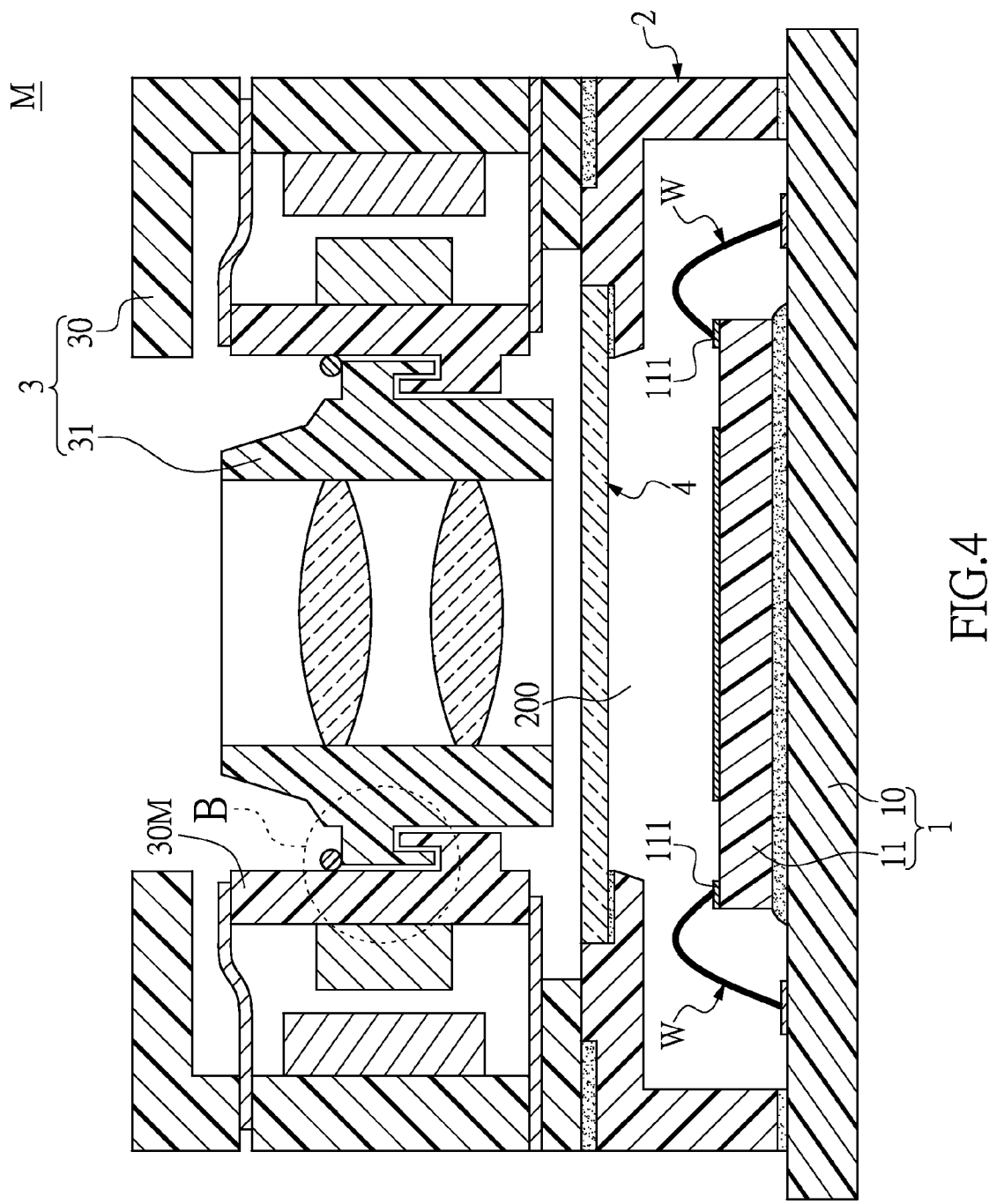
FIG. 4 shows a lateral, cross-sectional, schematic view of the image capturing module having a built-in dustproof structure and using a voice coil motor actuator according to the second embodiment of the instant disclosure.
Figure 5:
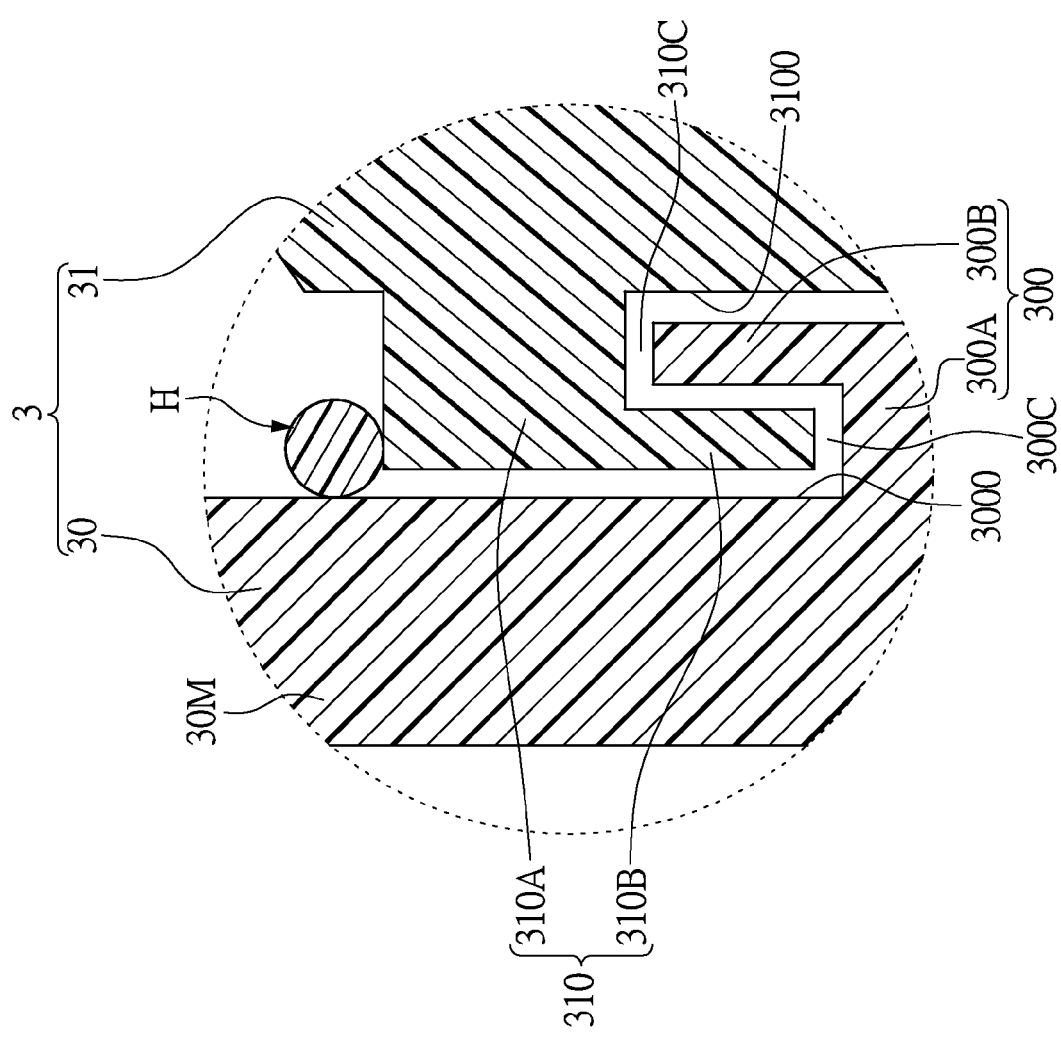
FIG. 5 is an enlarged view taken on part B of FIG. 4.

Referring to FIG. 4 and FIG. 5, FIG. 4 shows a lateral, cross-sectional, schematic view of the image capturing module having a built-in dustproof structure and using a voice coil motor actuator according to the second embodiment of the instant disclosure and FIG. 5 is an enlarged view taken on part B of FIG. 4, the second embodiment of the instant disclosure provides an image capturing module M having a built-in dustproof structure, comprising: an image sensing unit 1, a housing frame 2 and an actuator structure 3. Comparing FIG. 4 with FIG. 1, and comparing FIG. 5 with FIG. 2, the difference between the second embodiment and the first embodiment is as follows: in the second embodiment, the second surrounding structure 310 has a second surrounding extending portion 310A substantially horizontally extended from the outer perimeter surface 3100 of the movable lens assembly 31 and toward the inner surrounding surface 3000 of the movable lens assembly 30 and a second surrounding blocking portion 310B substantially downwardly and vertically extended from the second surrounding extending portion 310A, the second surrounding extending portion 310A is adjacent to the first surrounding blocking portion 300B and disposed above the first surrounding blocking portion 300B, and the first surrounding extending portion 300A is adjacent to the second surrounding blocking portion 310B and disposed under the second surrounding blocking portion 310B. In other words, the second surrounding structure 310 has a second surrounding extending portion 310A substantially horizontally extended from the outer perimeter surface 3100 of the movable lens assembly 31 and toward the inner surrounding surface 3000 of the surrounding movable member 30M and a second surrounding blocking portion 310B substantially downwardly and vertically extended from the second surrounding extending portion 310A.

More precisely, as shown in FIG. 5, the outer perimeter surface 3100, the second surrounding extending portion 310A and the second surrounding blocking portion 310B of the movable lens assembly 31 are sequentially connected to form a second surrounding space 310C, wherein one portion (one part) of the first surrounding blocking portion 300B is arranged in the second surrounding space 310C, and one portion of the second surrounding blocking portion 310B is received in the first surrounding space 300C. Whereby, when the external dust passes through the gap between the inner surrounding surface 3000 of the lens holder 30 or the surrounding movable member 30M and the second surrounding structure 310 of the movable lens assembly 31 to get into the built-in dustproof structure that is composed of the first surrounding structure 300 and the second surrounding structure 310, the external dust is obstructed by the first surrounding blocking portion 300B, so that the external dust can be gathered in the first surrounding space 300C.

It is worth mentioning that the movable lens assembly 31 can be fixed inside the surrounding movable member 30M through the at least two tiny bonding glue H on the premise of the following conditions: (1) the bottom side of the surrounding movable member 30M directly contacts the top surface of the optical filter 4; (2) the bottom side of the surrounding movable member 30M directly contacts the top side of the housing frame 2; or (3) the second surrounding structure 310 directly contacts the first surrounding structure 300, but it is merely an example and is not meant to limit the instant disclosure.

Third Embodiment

Figure 6:
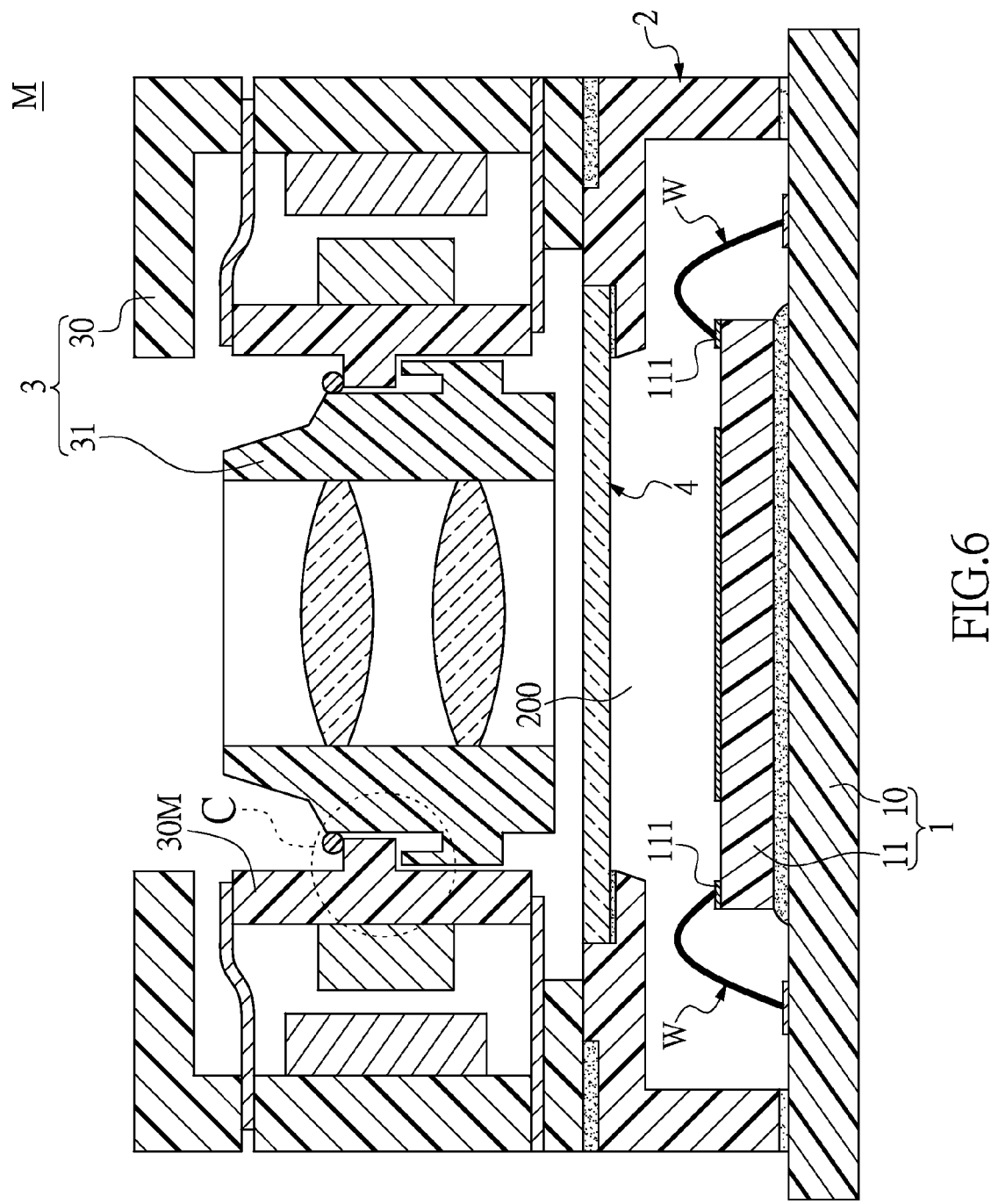
FIG. 6 shows a lateral, cross-sectional, schematic view of the image capturing module having a built-in dustproof structure and using a voice coil motor actuator according to the third embodiment of the instant disclosure.
Figure 7:
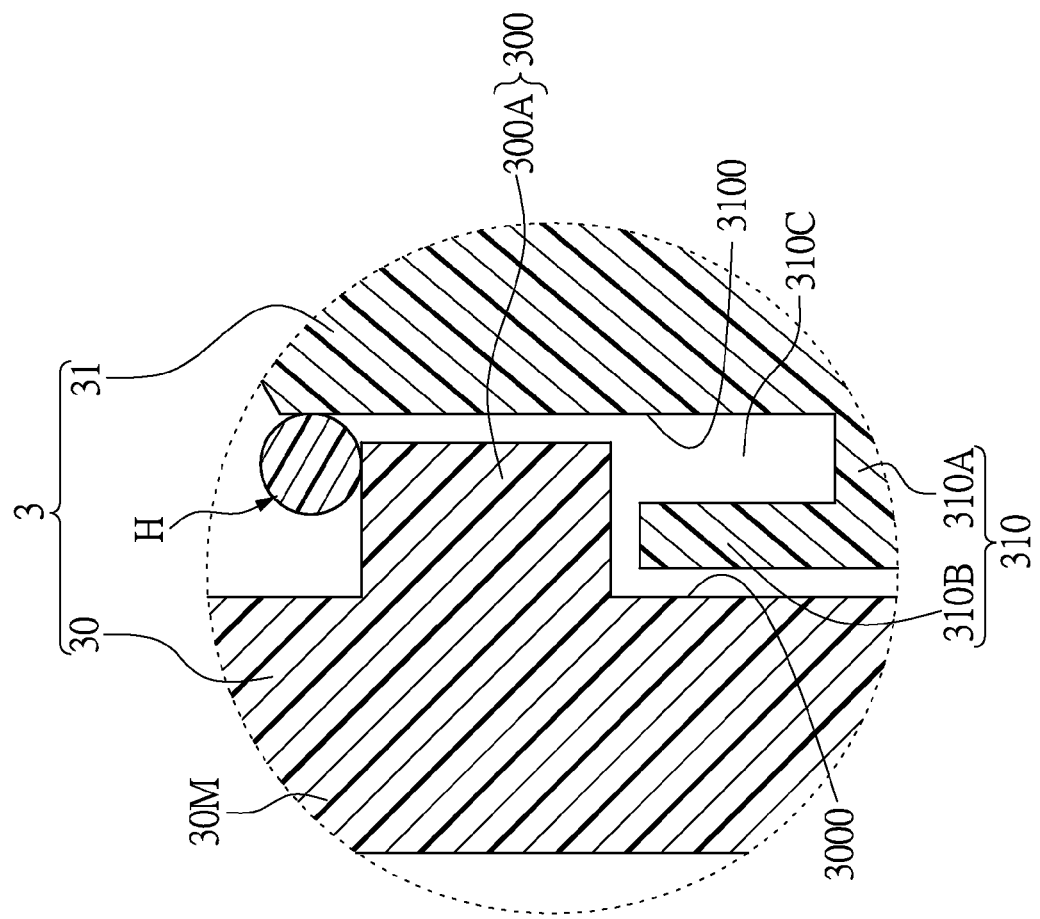
FIG. 7 is an enlarged view taken on part C of FIG. 6.

Referring to FIG. 6 and FIG. 7, FIG. 6 shows a lateral, cross-sectional, schematic view of the image capturing module having a built-in dustproof structure and using a voice coil motor actuator according to the third embodiment of the instant disclosure and FIG. 7 is an enlarged view taken on part C of FIG. 6, the third embodiment of the instant disclosure provides an image capturing module M having a built-in dustproof structure, comprising: an image sensing unit 1, a housing frame 2 and an actuator structure 3. Comparing FIG. 6 with FIG. 4, and comparing FIG. 7 with FIG. 5, the difference between the third embodiment and the second embodiment is as follows: in the third embodiment, the first surrounding structure 300 has a first surrounding extending portion 300A substantially horizontally extended from the inner surrounding surface 3000 of the lens holder 30 and toward the outer perimeter surface 3100 of the movable lens assembly 31. The second surrounding structure 310 has a second surrounding extending portion 310A substantially horizontally extended from the outer perimeter surface 3100 of the movable lens assembly 31 and toward the inner surrounding surface 3000 of the movable lens assembly 30 and a second surrounding blocking portion 310B substantially upwardly and vertically extended from the second surrounding extending portion 310A, and the outer perimeter surface 3100, the second surrounding extending portion 310A and the second surrounding blocking portion 310B of the movable lens assembly 31 are sequentially connected to form a second surrounding space 310C.

Whereby, when the external dust passes through the gap between the first surrounding extending portion 300A of the lens holder 30 or the surrounding movable member 30M and the outer perimeter surface 3100 of the movable lens assembly 31 to get into the built-in dustproof structure that is composed of the first surrounding structure 300 and the second surrounding structure 310, the external dust is obstructed by the second surrounding blocking portion 310B, so that the external dust can be gathered in the second surrounding space 310C.

Fourth Embodiment

Figure 8:
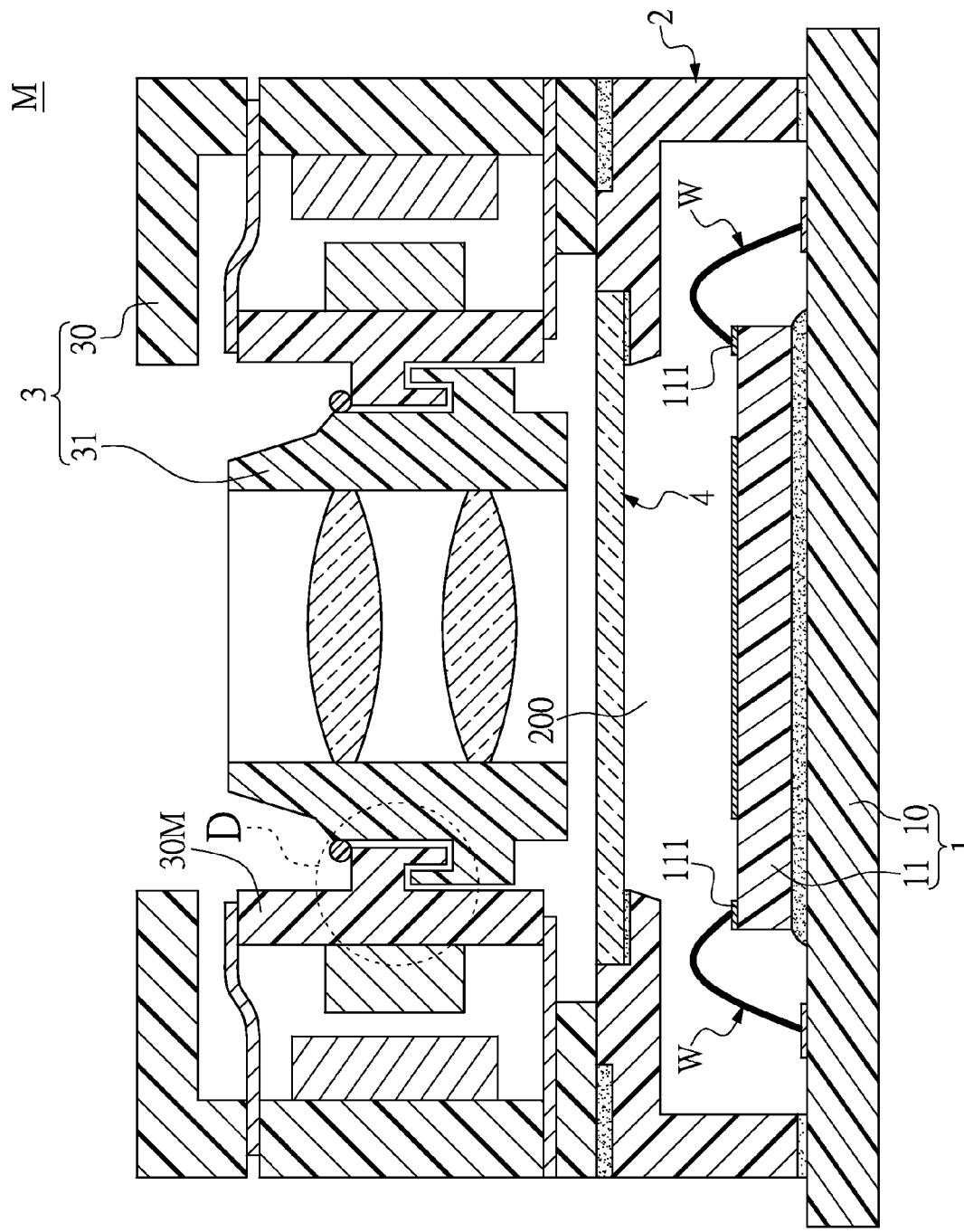
FIG. 8 shows a lateral, cross-sectional, schematic view of the image capturing module having a built-in dustproof structure and using a voice coil motor actuator according to the fourth embodiment of the instant disclosure.
Figure 9:
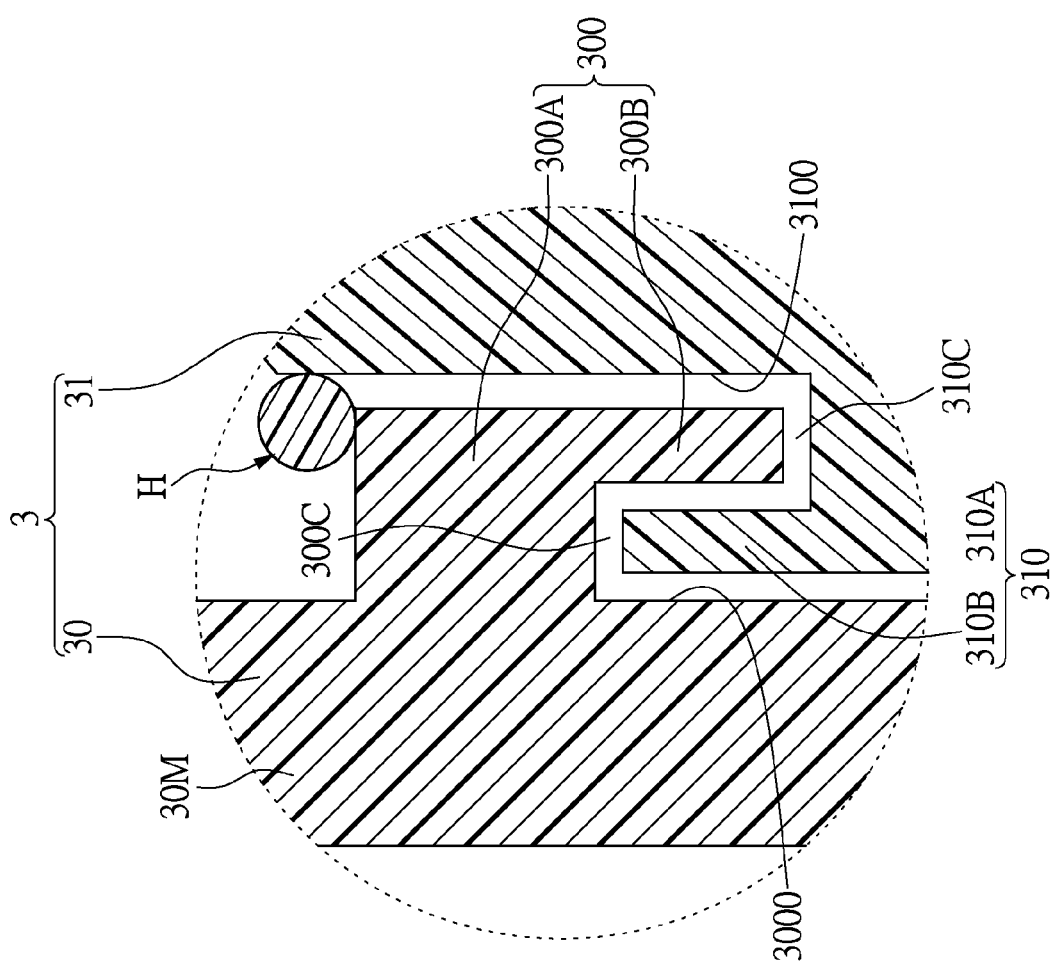
FIG. 9 is an enlarged view taken on part D of FIG. 8.

Referring to FIG. 8 and FIG. 9, FIG. 8 shows a lateral, cross-sectional, schematic view of the image capturing module having a built-in dustproof structure and using a voice coil motor actuator according to the fourth embodiment of the instant disclosure and FIG. 9 is an enlarged view taken on part D of FIG. 8, the fourth embodiment of the instant disclosure provides an image capturing module M having a built-in dustproof structure, comprising: an image sensing unit 1, a housing frame 2 and an actuator structure 3. Comparing FIG. 8 with FIG. 6, and comparing FIG. 9 with FIG. 7, the difference between the fourth embodiment and the third embodiment is as follows: in the fourth embodiment, the first surrounding structure 300 has a first surrounding extending portion 300A substantially horizontally extended from the inner surrounding surface 3000 of the lens holder 30 and toward the outer perimeter surface 3100 of the movable lens assembly 31 and a first surrounding blocking portion 300B substantially upwardly and vertically extended from the first surrounding extending portion 300A, and the inner surrounding surface 3000, the first surrounding extending portion 300A and the first surrounding blocking portion 300B of the lens holder 30 are sequentially connected to form a first surrounding space 300C.

Whereby, when the external dust passes through the gap between the first surrounding structure 300 of the lens holder 30 or the surrounding movable member 30M and the outer perimeter surface 3100 of the movable lens assembly 31 to get into the built-in dustproof structure that is composed of the first surrounding structure 300 and the second surrounding structure 310, the external dust is obstructed by the second surrounding blocking portion 310B, so that the external dust can be gathered in the second surrounding space 310C.

In conclusion, because the lens holder 30 has a first surrounding structure 300 disposed on the inner surrounding surface 3000 thereof and the movable lens assembly 31 has a second surrounding structure 310 disposed on the outer perimeter surface 3100 thereof and located above the first surrounding structure 300, the first surrounding structure 300 of the lens holder 30 and the second surrounding structure 310 of the movable lens assembly 31 can be mated with each other to form the built-in dustproof structure. Whereby, when the external dust passes through the gap between the lens holder 30 (or the surrounding movable member 30M) and the movable lens assembly 31 to get into the built-in dustproof structure that is composed of the first surrounding structure 300 and the second surrounding structure 310, the external dust is obstructed by the first surrounding blocking portion 300B (or the second surrounding blocking portion 310B), so that the external dust can be gathered in the first surrounding space 300C (or the second surrounding space 310C).

The above-mentioned descriptions merely represent the preferred embodiments of the instant disclosure, without any intention or ability to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:

1. An image capturing module having a built-in dustproof structure, comprising:
   an image sensing unit including a substrate and an image sensing chip disposed on the substrate and electrically connected to the substrate;
   a housing frame disposed on the substrate to surround the image sensing chip;
   an actuator structure disposed on the housing frame and located above the image sensing chip, wherein the actuator structure includes a lens holder disposed on the housing frame and a movable lens assembly movably disposed inside the lens holder;
   wherein the lens holder has a first surrounding structure disposed on the inner surrounding surface thereof, and the movable lens assembly has a second surrounding structure disposed on the outer perimeter surface thereof and located above the first surrounding structure, and the first surrounding structure of the lens holder and the second surrounding structure of the movable lens assembly are mated with each other to form the built-in dustproof structure.

2. The image capturing module of claim 1, further comprising: an optical filter disposed on the housing frame and located between the image sensing chip and the movable lens assembly, wherein the housing frame has a top opening enclosed by the optical filter, wherein both the inner surrounding surface of the lens holder and the outer perimeter surface of the movable lens assembly are threadless surfaces or thread surfaces.

3. The image capturing module of claim 1, wherein the first surrounding structure has a first surrounding extending portion substantially horizontally extended from the inner surrounding surface of the lens holder and toward the outer perimeter surface of the movable lens assembly and a first surrounding blocking portion substantially upwardly and vertically extended from the first surrounding extending portion, and the inner surrounding surface, the first surrounding extending portion and the first surrounding blocking portion of the lens holder are sequentially connected to form a first surrounding space, wherein the second surrounding structure has a second surrounding extending portion substantially horizontally extended from the outer perimeter surface of the movable lens assembly and toward the inner surrounding surface of the lens holder, and the second surrounding extending portion is adjacent to the first surrounding blocking portion and disposed above the first surrounding blocking portion.

4. The image capturing module of claim 1, wherein the first surrounding structure has a first surrounding extending portion substantially horizontally extended from the inner surrounding surface of the lens holder and toward the outer perimeter surface of the movable lens assembly and a first surrounding blocking portion substantially upwardly and vertically extended from the first surrounding extending portion, and the inner surrounding surface, the first surrounding extending portion and the first surrounding blocking portion of the lens holder are sequentially connected to form a first surrounding space, wherein the second surrounding structure has a second surrounding extending portion substantially horizontally extended from the outer perimeter surface of the movable lens assembly and toward the inner surrounding surface of the lens holder and a second surrounding blocking portion downwardly and vertically extended from the second surrounding extending portion, the second surrounding extending portion is adjacent to the first surrounding blocking portion and disposed above the first surrounding blocking portion, and the first surrounding extending portion is adjacent to the second surrounding blocking portion and disposed under the second surrounding blocking portion.

5. The image capturing module of claim 4, wherein the outer perimeter surface, the second surrounding extending portion and the second surrounding blocking portion of the movable lens assembly are sequentially connected to form a second surrounding space, one portion of the first surrounding blocking portion is arranged in the second surrounding space, and one portion of the second surrounding blocking portion is received in the first surrounding space.

6. An image capturing module having a built-in dustproof structure, comprising:
   an image sensing unit including a substrate and an image sensing chip disposed on the substrate and electrically connected to the substrate;
   a housing frame disposed on the substrate to surround the image sensing chip;
   an actuator structure disposed on the housing frame and located above the image sensing chip, wherein the actuator structure includes a lens holder disposed on the housing frame and a movable lens assembly disposed inside the lens holder, the lens holder includes a surrounding movable member movably disposed therein, the movable lens assembly is fixed inside the surrounding movable member through at least two tiny bonding glue, and the movable lens assembly is movably disposed inside the lens holder through the surrounding movable member;
   wherein the surrounding movable member of the lens holder has a first surrounding structure disposed on the inner surrounding surface thereof, and the movable lens assembly has a second surrounding structure disposed on the outer perimeter surface thereof and located above the first surrounding structure, and the first surrounding structure of the surrounding movable member and the second surrounding structure of the movable lens assembly are mated with each other to form the built-in dustproof structure.

7. The image capturing module of claim 6, further comprising: an optical filter disposed on the housing frame and located between the image sensing chip and the movable lens assembly, wherein the housing frame has a top opening enclosed by the optical filter, wherein both the inner surrounding surface of the surrounding movable member and the outer perimeter surface of the movable lens assembly are threadless surfaces or thread surfaces, and the bottom side of the surrounding movable member directly contacts the top side of the optical filter.

8. The image capturing module of claim 6, wherein the first surrounding structure has a first surrounding extending portion substantially horizontally extended from the inner surrounding surface of the surrounding movable member and toward the outer perimeter surface of the movable lens assembly and a first surrounding blocking portion substantially upwardly and vertically extended from the first surrounding extending portion, and the inner surrounding surface, the first surrounding extending portion and the first surrounding blocking portion of the surrounding movable member are sequentially connected to form a first surrounding space, wherein the second surrounding structure has a second surrounding extending portion substantially horizontally extended from the outer perimeter surface of the movable lens assembly and toward the inner surrounding surface of the surrounding movable member, and the second surrounding extending portion is adjacent to the first surrounding blocking portion and disposed above the first surrounding blocking portion, wherein the bottom side of the surrounding movable member directly contacts the top side of the housing frame.

9. The image capturing module of claim 6, wherein the first surrounding structure has a first surrounding extending portion substantially horizontally extended from the inner surrounding surface of the surrounding movable member and toward the outer perimeter surface of the movable lens assembly and a first surrounding blocking portion substantially upwardly and vertically extended from the first surrounding extending portion, and the inner surrounding surface, the first surrounding extending portion and the first surrounding blocking portion of the surrounding movable member are sequentially connected to form a first surrounding space, wherein the second surrounding structure has a second surrounding extending portion substantially horizontally extended from the outer perimeter surface of the movable lens assembly and toward the inner surrounding surface of the surrounding movable member and a second surrounding blocking portion downwardly and vertically extended from the second surrounding extending portion, the second surrounding extending portion is adjacent to the first surrounding blocking portion and disposed above the first surrounding blocking portion, and the first surrounding extending portion is adjacent to the second surrounding blocking portion and disposed under the second surrounding blocking portion.

10. The image capturing module of claim 9, wherein the outer perimeter surface, the second surrounding extending portion and the second surrounding blocking portion of the movable lens assembly are sequentially connected to form a second surrounding space, one portion of the first surrounding blocking portion is arranged in the second surrounding space, and one portion of the second surrounding blocking portion is received in the first surrounding space, wherein the second surrounding structure directly contacts the first surrounding structure.

* * * * *